Sept. 23, 1969 H. KNAPP 3,468,232
CONTROL DEVICE FOR A SINGLE-LENS REFLEX CAMERA
Filed July 20, 1966 3 Sheets-Sheet 1
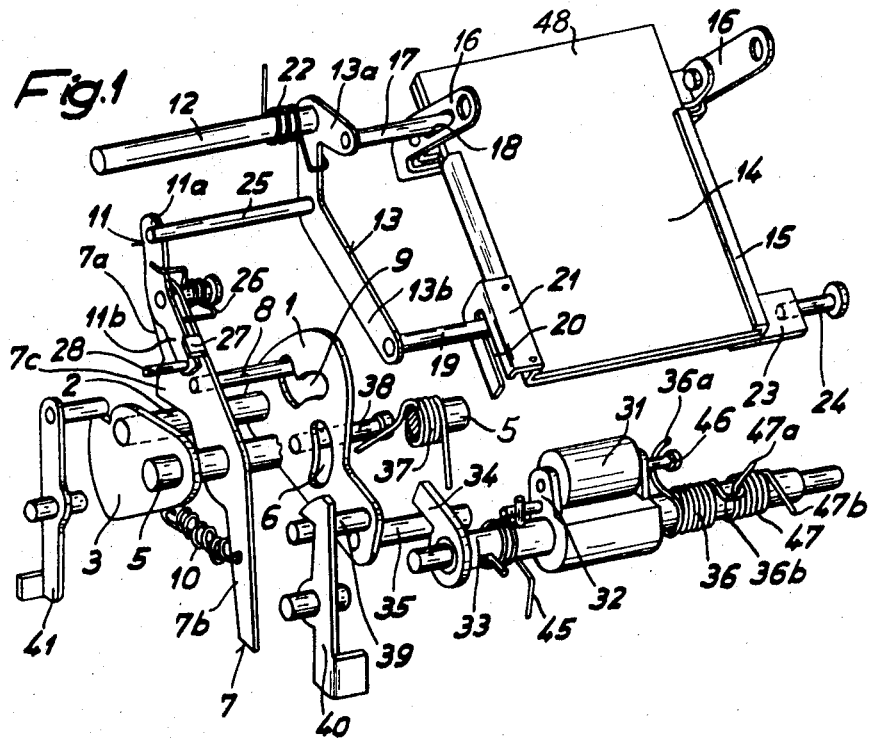
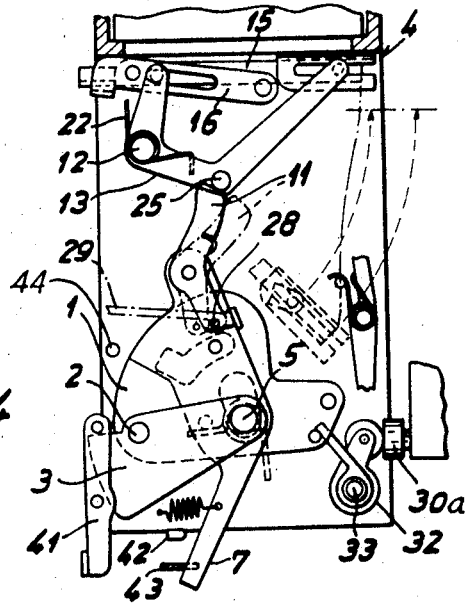
INVENTOR
Helmut Knapp
By
Sparrow and Sparrow
ATTORNEYS Sept. 23, 1969  H. KNAPP  3,468,232
CONTROL DEVICE FOR A SINGLE-LENS REFLEX CAMERA
Filed July 20, 1966  3 Sheets-Sheet 2

INVENTOR
Helmut Knapp
By
Sparrow and Sparrow
ATTORNEYS

Sept. 23, 1969   H. KNAPP   3,468,232
CONTROL DEVICE FOR A SINGLE-LENS REFLEX CAMERA
Filed July 20, 1966   3 Sheets-Sheet 3

INVENTOR
Helmut Knapp
By
Sparrow and Sparrow
ATTORNEYS

United States Patent Office 3,468,232
Patented Sept. 23, 1969

3,468,232
CONTROL DEVICE FOR A SINGLE-LENS REFLEX CAMERA
Helmut Knapp, 41 Kleiststrasse, 1 Berlin 30, Germany
Filed July 20, 1966, Ser. No. 566,657
Claims priority, application Germany, July 21, 1965,
J 28,616
Int. Cl. G03b 19/12
U.S. Cl. 95—42                                            4 Claims

ABSTRACT OF THE DISCLOSURE

A single-lens reflex camera having a reflex mirror of increased dimensions. When the mirror is moved between its viewing and exposure positions, it is initially moved in a substantially vertical direction. This enables the mirror to clear the rear lens of the objective system. The mirror is then pivoted in an angular direction to its exposure position adjacent the image entrance wall of the view-finder. The entire mechanism consists of linkages, levers and pins without the use of gears.

BACKGROUND OF THE INVENTION

The present invention relates to a photographic camera of the single-lens reflex type and more particularly to the mechanism for operating the viewing mirror and to the actuating and control mechanism for automatical and sequential controlling the diaphragm, said mirror operating mechanism and the releasing of curtain shutter.

In known types of this camera, the viewing mirror is mounted in the camera housing for movement about an axis fixed to said housing. For receiving bright pictures in the view-finder device this mirror must have a dimension in the viewing position where it extends in a 45° angle to the axis of the objective lens so that it may reflect all the light passing through said lens to the view-finding device. When moving this mirror to its ineffective position during exposure the path of movement must be clear of any restricting part making it impossible to use short focal length objectives having a rear lens close to the film plane. Additionally it is difficult in known types of cameras to get the mirror in its ineffective position in a really light-tight contact to the picture area aperture of the housing.

SUMMARY OF THE INVENTION

The invention provides an improved mechanism for operating the viewing mirror making it possible to use larger mirror dimensions by guiding this mirror so that its front edge is moved in a non-circular path being nearly straight in the region which may be occupied by the rear lens of the objective. It also provides a simple construction of the actuating and control mechanism composed only of levers which may be produced with a minimum of costs.

BRIEF DESCRIPTION OF THE DRAWINGS

The purposes of the invention may be obtained in the manner disclosed as an illustrative embodiment of the invention in the following description and in the accompanying drawings forming a part hereof in which:

FIG. 1 shows a perspective view of the camera mechanism with the mirror in viewing position; and
FIGS. 2 to 6 show side views of the camera mechanism illustrating five different operation positions.

DESCRIPTION OF THE PREFERRED EMBODIMENT

Figure 2:
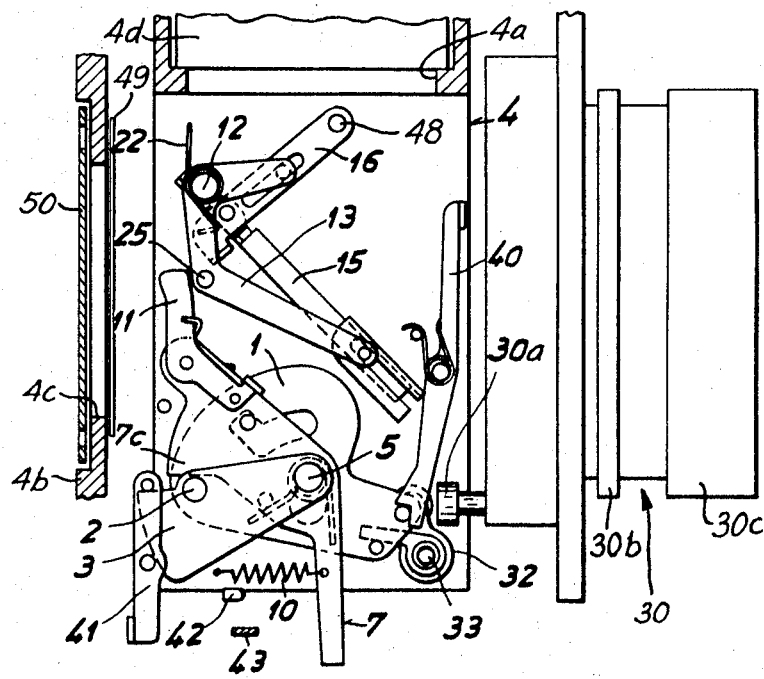

A control plate 1 is pivotally mounted on an axle 2. The axle 2 is rigidly fixed at the end of a one-armed guide lever 3 which is pivotally mounted on a shaft 5 fastened in the camera housing 4. For limiting the pivoting movement of the plate 1 relative to the shaft 5 it is provided with an elongated slot 6 of a curvature in the shape of a circular arc arranged concentrically to the axis of the axle 2, through which slot the shaft 5 passes. On the shaft 5 there is pivotally mounted a control lever 7, which engages with a pin 8 rigidly fixed on one arm 7a of its arms in a recess 9 provided in the control plate 1. On the other arm 7c of the control lever 7 there is anchored one end of an operating spring 10 configured as a tension spring, which is anchored with its other end to the camera housing 4. The control lever is provided on the free end of its one arm 7a with a latch lever 11, by means of which it moves under the action of the spring 10 a mirror guiding lever 13 for the viewing mirror after being released. The guiding lever 13 is provided with an axle 12 pivotably mounted in the camera housing.

The viewing mirror is suspended in the camera housing 4 by means of a mirror carrying lever 16 pivoted to the end of the mirror supporting plate 15 which is opposite to the camera objective. The guiding lever 13 for the viewing mirror 14 is formed like a bell crank lever with a short bell crank leg 13a and long bell crank leg 13b, which lever engages with a pin 17 provided at the extremity of the short leg 13a in a slot 18 provided in the mirror carrying lever 16, and with a pin 19 provided on the extremity of the long leg 13b in a slot 20 parallel to the mirror surface, which slot is arranged in a lug 21 on the end of the mirror suspending plate 15 near the objective. A spring 22 engages the guide lever 13 serving for returning the viewing mirror 14 into a first effective viewing position (FIGS. 1, 2, 3, 5, 6) where it lies in the optical path between the exposure aperture 4c formed in the housing and the objective lens assembly 30 extending across the optical axis of the objective lens at a 45° angle thereto in order to reflect the image into the view-finder device 4a from a second ineffective position (FIG. 4) during exposure where the mirror is clear of said optical path and lies at least approximately parallel to said optical axis closing the picture area aperture 4d formed in the housing whereby light cannot pass through the view-finder device into the interior of the housing. Under the force of this spring 10 the viewing mirror in its first position reposes with a stop 23 mounted on the extremity of the mirror supporting plate 15 near the objective on an abutment formed by a pin 24 fixed at the housing. The latch lever 11 is formed by a two-armed lever pivotally mounted on the leg 7a of the control lever 7, which two-armed lever cooperates with its arm 11a protruding over the leg 7a of the control lever with a pin 25 fixed to the mirror guiding lever 13 while it is pulled with its other arm 11b by a spring 26 against an abutment 27 provided on the control lever. A pin 28 is provided on the arm 11b of the latch lever 11, which is adapted to engage with a pulling member 29 shown in dash-and-dot lines in FIG. 4 shortly before the control lever 7 is returned by the operating spring 10 into its least biased position. By means of this pulling member the latch lever 11 is brought shortly before the end of the run of the shutter 49 against the force of the spring 26 into a tilting position, in which it releases the pin 25 of the mirror guiding lever 13 which pin it has gripped with the free end of its arm 11a.

The transmission mechanism through which by the control plate 1 operates the diaphragm pressure pin 30a for shifting the diaphragm included in the objective lens assembly 30 from an open to a preset position adjusted by a selector ring 30b, is formed by a control arm 32 being in operative connection with the diaphragm pressure pin by means of a pressure roller 31. The said control arm 32 is pivotally mounted on a shaft 33, which cooperates by means of an arm 34 rigidly fixed thereon with a pin 35 mounted on the free extremity of the control plate 1. The control arm 32 is coupled in the pivoting direction towards the diaphragm pressure pin with the shaft by means of a helical torsion spring 36.

The helical torsion spring 36 surrounding the shaft 33, which is provided for a spring action of the control arm 32 on the diaphragm pressure pin 30, engages with its one extremity bent to a spring leg 36a a pin 46 on the control arm 32. The other end of the helical torsion spring 36 bent up to a hook 36b is anchored to the extremity bent up to a spring leg 47a of a friction coil spring 47 arranged likewise on the shaft 33, the non-positive connection of which coil spring with the shaft 33 can be resolved by a force effect on the spring leg 47a directed against the spring power of the helical torsion spring 36. By the release of the connection between the friction coil spring 47 and the shaft 33 in a simple manner a tension regulation of the helical torsion spring 36 can be effected by a corresponding adjustment of the friction coil spring 47 on the shaft 33. In the first state of the camera mechanism the viewing mirror 14 is, as is shown in FIGURES 1 and 2 in the said first position, in which under the action of the spring 22 transmitted by the mirror guiding lever 13 the pin 24 contacts the stop 23 of the viewing mirror mount 15. The control arm 32 for the diaphragm pressure pin 30a is thereby in a tilting position, in which the diaphragm pressure pin 30a is released and thus the diaphragm is in its full opened position.

The cocked state of the camera mechanism is obtained by the fact that the control lever 7 is swung in the cocked position against the force of its operating spring 10 and against the force of the spring 37 for the control plate 1 and the guide lever 3.

The cocking of the camera mechanism is made by means of the film transport lever (not shown in the drawing). For this purpose there is provided between the film transport lever and the control lever 7 a transmission device (not shown) engaging the arm 7b of control lever swinging the latter against the action of operating spring 10.

The control plate 1 and the guide lever 3 are blocked in the cocked state of the camera in a position, in which spring 37 wound around the shaft 5 is biased, which spring engages with one leg the camera housing 4 and with the other leg a pin 38 provided on the control plate 1.

The blocking of the control plate 1 and of the guide lever 3 is obtained by the fact that a pin 39 arranged on its free extremity of the control plate is latched by the release lever 40 of the camera and the guide lever 3 is latched by a blocking lever 41.

Figure 3:
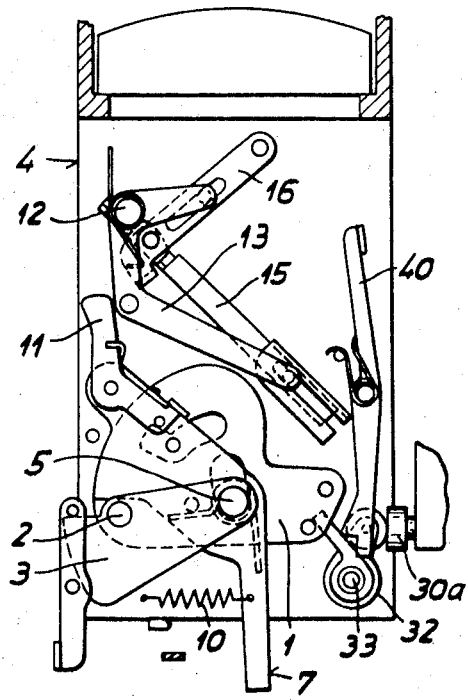
Figure 6:
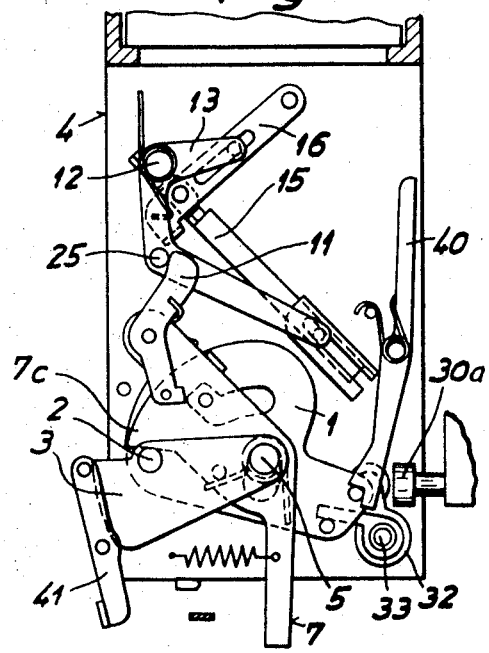

If the control plate 1 becomes free of the release lever 40 by the operation of the same, the control plate 1 is lifted into the pivoting position as shown in FIGURE 3. Thereby the control arm 32 for the diaphragm pressure pin 30 is brought into a tilting position by means of the pin 35 cooperating with the driver arm 34 in which position it shifts the diaphragm pressure pin 30a outwards, moving the diaphragm to the preset adjusted diaphragm value.

If now the control plate 1 is lifted by the spring 37 in a position in which the lower end of the elongated slot 6 rests on the shaft 5, the pin 8 is free from the outwards directed part of the recess 9 (FIG. 3). The control lever 7 thus released by the control plate 1 is returned under the action of the operating spring 10 from the cocked position into the rest position (FIGS. 4 and 5) in which its arm 7b is in contact with an abutment 42 fastened on the housing. With this movement the mirror guiding lever 13 from which the pin 25 extends into the path of the latch lever 11 provided on the arm 7a of control lever 7 is pivoted against the force of the spring 22 into a position, whereby the viewing mirror 14 is brought from the said first position into the second position (FIGURE 4). With the viewing mirror 14 in the second position a shutter release member 43 is actuated by the arm 7b of the control lever 7 returning into the rest position and thus the shutter is released.

Shortly before the end of the shutter run, the latch lever 11, being with its arm 11a under the pin 25 of the mirror guiding lever 13 will come into engagement with the pin 28 provided on its arm 11b with the pulling member 29 and is brought by the shutter into the tilting position shown in dash-dot lines in FIGURE 4, in which it releases the pin 25 of the mirror guiding lever 13, whereupon this lever is returned by the spring 22 and thus the viewing mirror 14 is brought back from the second position into the first position.

Figure 5:
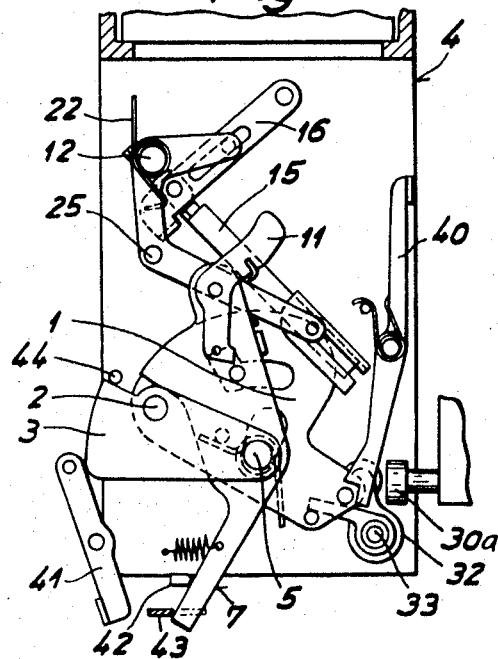

Simultaneously the blocking lever 41 for the guide lever 3 is brought by the shutter in a tilting position in which it releases the guide lever. The guide lever 3 thus released is pivoted, as shown in FIGURE 5, by the action of the spring 37 until it hits a stop 44 fastened on the housing. Thereby the control plate 1 is guided by the guide lever 3 in a path with the shaft 5 as center to a tilting position, in which its pin 39 is locked by the release lever 40 (FIG. 5). During this tilting movement of the control plate 1 the control arm 32 is brought back into the initial position by a spring 45 arranged on the shaft 33, which spring maintains the driver arm 34 in continuous contact with the pin 35 of the control plate 1. In this position the diaphragm pressure pin 30a is again released and the diaphragm is opened. When the camera mechanism, being now in the unlocked state, is locked anew, the control lever 7 is engaging by a cam 7c formed on its arm 7a the pin 2 whereby the guide lever 3 is pivoted around the shaft 5 which guide lever returns the control plate 1 to the blocking position, in which the guide lever 3 is locked by the blocking lever 41.

I claim:

1. In a photographic camera of the single-lens reflex type having a housing (4), a first wall (4b) of said housing formed with an exposure aperture (4c) through which film (50) in the camera is exposed, a curtain shutter (49) arranged close to the inner surface of said first wall, a second wall of said housing perpendicular to said first wall and formed with a picture area aperture (4a), a view-finder device (4d) arranged at said aperture, comprising an objective lens assembly (30) including a diaphragm and a pin (30a) for shifting said diaphragm from an open to a preset adjusted position, a viewing mirror (14) movable between a first effective viewing position before an exposure where it lies in the optical path between said exposure aperture (4c) and said objective lens assembly (30) extending across the optical axis of the objective lens at a 45° angle thereto in order to reflect the image into said view-finder device (4d) and a second ineffective position during exposure, where the mirror is clear of said optical path and lies at least approximately parallel to said optical axis closing said picture area aperture (4c) whereby light cannot pass through the view-finder device to the interior of the housing, a spring-biased actuating and control mechanism for sequentially actuating said shifting pin (30a), for moving said viewing mirror to its second position and for releasing said curtain shutter after being released by a hand-operated releasing means; the combination of a mirror carrying lever (16) mounted at one end for pivotal movement about a first axis (48) parallel to the plane of said film (50) and perpendicular to said objective lens optical axis at a place of said housing lateral to said viewing mirror (14) and close to said picture area aperture (4a) in the mid-region of width of said aperture, said lever being mounted for pivotal movement about an axis parallel to said first axis at its other end at said viewing mirror near to the rear end thereof adjacent to said film plane, said mirror carrying lever (16) having a slot (18) extending substantially in the longitudinal direction in the mid-region thereof, a slot (20)

formed laterally at the said viewing mirror (14) in a region adjacent to the front end thereof and extending substantially in a plane parallel to said mirror plane, a mirror guiding lever (13) mounted in said housing for pivotal movement about an axis parallel to said first axis (48), a first pin (17) and a second pin (19) protruding from one side of said lever adapted to engage in said slots (18, 20) formed in said mirror carrying lever (16) and said viewing mirror (14) respectively, a third pin (25) protruding from the other side of said mirror guiding lever, each of said first, second and third pins extending offset from and parallel to the pivotal axis of said mirror guiding lever, a first spring (22) urging said viewing mirror (14) into the first position, a central lever (7) in the actuating and control mechanism, said control lever pivotally mounted on a shaft (5), said shaft rigidly fixed in said housing and extending parallel to said first axis (48), a latch lever (11) pivoted to that one end of control lever nearer to said third pin (25) of said mirror guiding lever (13) for a movement about an axis parallel to said shaft (5), a cam (11a) at the free end of said latch lever being adapted to engage said third pin (25), an abutment (27) in said control lever (7), said abutment, blocking said latch lever (11) against pivotal movement when said cam bears against said third pin (25) in order to move said viewing mirror into said second position, a second spring (26) having one end anchored to said control lever (7) and the other end to said latch lever (11) biasing the latter to an abutment contacting position, third spring (10) having one end anchored to said housing and the other to said control lever (7) biasing the latter for placing said viewing mirror in said second position, and a fourth pin (8) protruding from said control lever for locking the same in the most biased position until being released after releasing said actuating and control mechanism.

2. A photographic camera according to claim 1 wherein is arranged at each side of said viewing mirror (14) a mirror carrying lever (16), both levers being rigidly interconnected by a bar extending transversely to said mirror at the lower side thereof.

3. A photographic camera according to claim 1 wherein said mirror guiding lever (13) consists of a flat U-shaped strip having a shorter (13a) and a longer (13b) leg, said first pin (17) being fixed to the free end of said shorter leg, said second pin (19) being fixed to the free end of said longer leg (13b), and said third pin fixed at a place near the angle formed by said longer leg with an intermediate leg, and a shaft (12) fixed at a place near the angle formed by said shorter leg with said intermediate leg, said shaft being rotatably mounted in said housing.

4. A photographic camera according to claim 1 wherein a guide lever (3) mounted at one end thereof for pivotal movement on said shaft (5) carrying said control lever (7), said guide lever being formed at the other end thereof with a nose adapted to latch up in a lower position of said guide lever with a latch (41), coupled to be released by the shutter run, and said nose limiting the upwards directed movement of said guide lever abutting against an abutment (44) fixed in said housing, an axle (2) fixed on said guide lever, said axle extending parallel to said shaft (5), a control plate (1) pivotally mounted on said axle (2) said plate being formed with a slot (6) through which said shaft (5) passes and a hook-shaped recess (9) receiving said pin (8) protruding from said control lever, a spring (37) biasing said control plate (1) for pivotal movement, a pin protruding from said control plate, a camera release lever (40), adapted to be releasably engaged by said camera release lever, and a further pin (35) protruding from said control plate, said further pin adapted to operate the drive mechanism (34, 33, 45, 32, 31, 36a, 46, 36, 36b, 47, 47a, 47b) for actuating said diagram shifting pin (30a).

References Cited

UNITED STATES PATENTS

| | | | |
|---|---|---|---|
| 3,094,913 | 6/1963 | Morelle. | |
| 3,122,078 | 2/1964 | Singer | 95—42 |
| 3,126,806 | 3/1964 | Weissner et al. | 95—42 |
| 3,185,058 | 5/1965 | Singer | 95—42 |
| 3,221,626 | 12/1965 | Fuketa | 95—42 |

NORTON ANSHER, Primary Examiner

RICHARD L. MOSES, Assistant Examiner

U.S. Cl. X.R.

95—64